Aug. 5, 1958    J. W. O'BRIEN    2,845,781
UNIVERSAL COUPLING
Filed April 21, 1955    3 Sheets-Sheet 2

INVENTOR.
JEREMIAH W. O'BRIEN
BY
J. E. Dickinson
HIS ATTORNEY

Aug. 5, 1958   J. W. O'BRIEN   2,845,781
UNIVERSAL COUPLING

Filed April 21, 1955   3 Sheets-Sheet 3

INVENTOR.
JEREMIAH W. O'BRIEN
BY
J. E. Dickinson
HIS ATTORNEY

United States Patent Office 2,845,781
Patented Aug. 5, 1958

2,845,781

UNIVERSAL COUPLING

Jeremiah W. O'Brien, Pleasant Hills, Pa., assignor to United Engineering and Foundry Company, Pittsburgh, Pa., a corporation of Pennsylvania Application April 21, 1955, Serial No. 502,857

12 Claims. (Cl. 64—9)

This invention relates to a universal coupling and in particular to a coupling adapted to be employed in conjunction with and for connecting together in driving relationship the rolls of a rolling mill and the pinion stands associated therewith.

The usual type of couplings presently employed in rolling mill practice are not only difficult to assemble but there are further disadvantages inherent in such couplings even after they are assembled inasmuch as they are open and hence do not retain the lubricant therein nor do they prevent dirt and mill grime from entering the coupling. To avoid some of the foregoing disadvantages, it has been proposed to employ a flexible enclosure which is attached to the casing of the coupling and to the spindle proper. When a roll is to be changed or removed from the mill employing this type of enclosure, it is necessary to detach the boot and then slide out the roll with the roll end coupling half casing remaining on the end thereof. If, however, the roll end coupling half were not removed with the roll, then the coupling will drop downward and thereby cause the casing and spindle to be axially misaligned. It then becomes necessary, when the end of the roll is to be reinserted in the coupling casing, to raise the coupling vertically in order to realign it with the roll. This operation is not only time-consuming but is quite awkward and results in a very unsatisfactory condition.

As opposed to the difficulties experienced in the use of present-day couplings, a rolling mill coupling employing the features of the invention herein disclosed overcomes the foregoing unsatisfactory conditions by providing a totally enclosed coupling which retains lubricant, prevents dirt and mill grime from entering therein not only during normal operation but during the time rolls are being changed and assures that roll changing will be carried out easily and rapidly inasmuch as the coupling casing remains on and is always in axial alignment with the spindle.

One of the objects of this invention therefore is to provide an improved coupling which incorporates novel means having casings associated therewith which are maintained in axial alignment with the coupling spindle when the roll is removed from the coupling.

Another object of this invention is to provide an enclosed coupling employing a casing for engaging with the end of a rolling mill roll and a yieldable element for urging the casing of the coupling in an axial outward direction with sufficient force to maintain the casing in an axially aligned relationship with respect to the spindle.

Still another object of this invention is to provide a coupling having elements associated therewith for absorbing the shock normally incident to striking the end of the roll against the casing when the roll is being connected to the coupling.

A further object of this invention is to provide a coupling for a rolling mill which is adapted to be relatively quickly connected to and disconnected from the driving and driven elements of a mill and which is self-contained for retaining the lubricant therein either when connected to or disconnected from the driven and driving elements.

These objects, as well as the various other novel features and advantages of this invention will be apparent from the following description and accompanying drawings of which:

Figure 1:
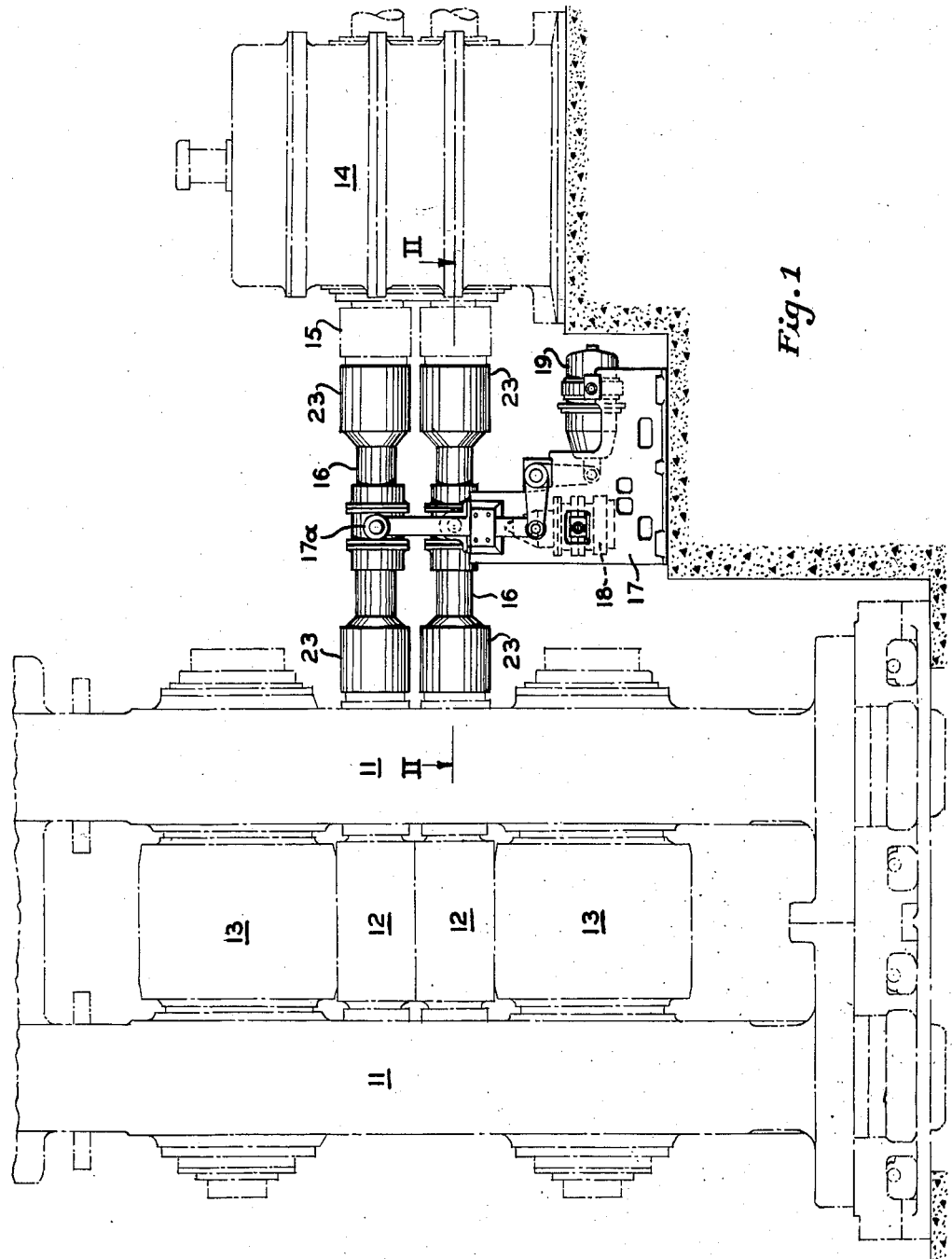
Figure 1 is an elevation view of a rolling mill and rolling mill drive having interposed therebetween a pair of universal couplings embodying the features of the invention herein disclosed.

With reference to the drawings, particularly Figure 1, there is shown therein in outline form a rolling mill having a pair of housings 11 within which there are mounted work rolls 12 and backing up rolls 13 and a pinion stand 14 having shafts 15 extending therefrom to which a pair of universal coupling spindles 16 are connected and supported on a carrier 17 positioned between the mill and the pinion stand. Each of the universal spindles is rotatably supported in suitable bearing assemblies 17a which are connected by separate pairs of suitable links to similar piston-cylinder assemblies 18 and 19 mounted upon the carrier frame as shown in Figure 1. The weight of the spindles, therefore, is supported by the carrier so that very little load by reason of the weight of the spindles is imposed upon the roll necks and pinion stand shafts.

Figure 2:
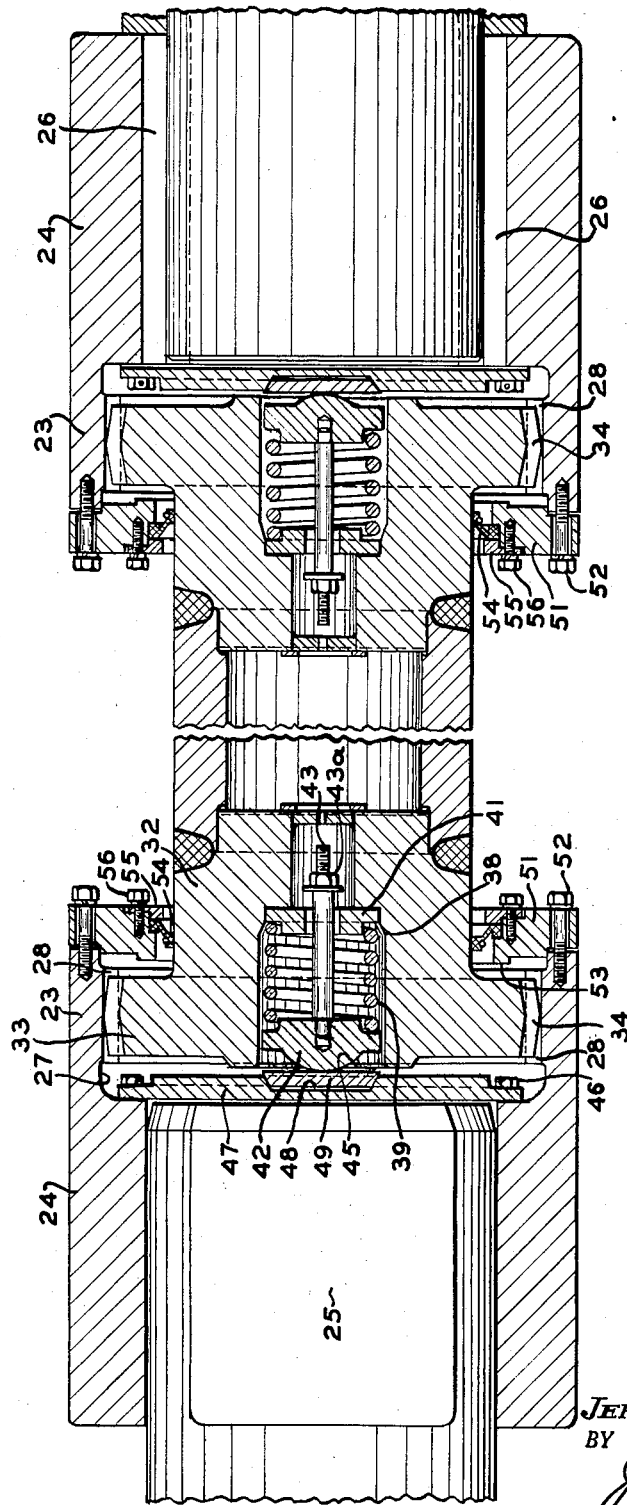
Figure 2 is a sectional view taken on a horizontal plane through the coupling in which the roll neck and the end of the mill pinion shaft are shown connected to the coupling.
Figure 4:
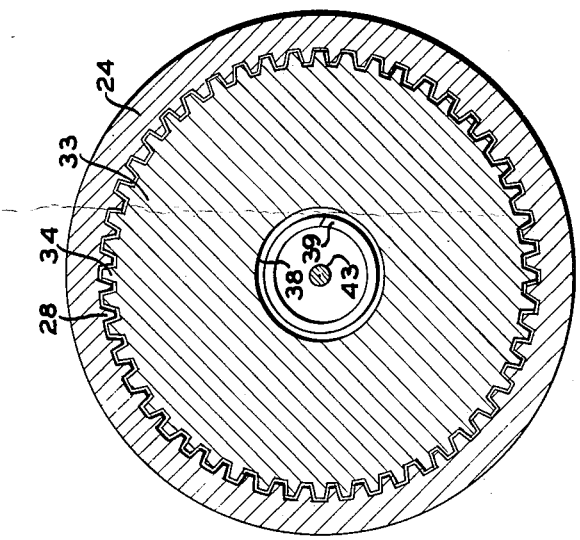
Figure 4 is a sectional view taken on the line IV—IV of Figure 3.
Figure 3:
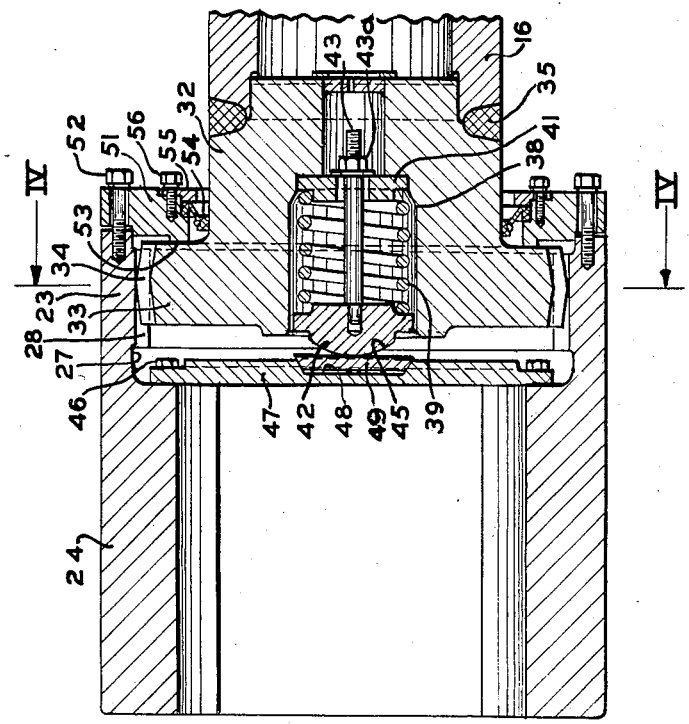
Figure 3 is a sectional view of the coupling taken at the rolling mill side and from which the neck of the roll has been withdrawn.

The coupling elements employed at the ends of the spindles 16 for connecting together the work rolls and the pinion stand drive shafts are as shown in Figures 2, 3 and 4. Since the coupling members at each end of the spindle are essentially the same, the members at the end of the coupling adjacent to the rolling mill roll neck will be described in detail and the reference numerals applied to the couplings at each end of the spindle as indicated in Figure 2. In this figure the spindle 16 has connected to each of its ends a coupling designated generally by the numeral 23. For providing a slip connection between the ends of the rolls and the spindle, each coupling includes a hollow casing or female member 24 having oppositely disposed internal flat surfaces which correspond to the diametrically opposed flat surfaces 25 machined on the neck of the roll. The coupling 23 at the pinion stand end also includes a hollow casing 24 which is provided with a cylindrical opening within which the pinion stand drive shaft is inserted and secured to the sleeve by means of two keys 26. Thus, a permanent connection is made between the casing 24 and the pinion stand drive shafts whereas a slip connection is made between the casing 24 and the neck of the roll. The casings 24 extend axially along the ends of the spindle and each one is provided with a machined-out portion 27 having integrally formed therein a series of involute straight gear teeth 28. Inserted into the end of the casing 24 there is a male coupling member 32, having a hub 33 with a series of teeth 34 formed thereon, which teeth engage with those within the casing 24. The teeth on the male member are formed so as to permit angular movement between the casing and the spindle in order to effect the desired universal action for varying the angle of drive through the elements. For permitting axial movement between the casing and the spindle both during operation and on assembly and disassembly, the teeth within the casing are somewhat longer than those of the male member. The male coupling members 32 are, in the instant case, connected to the ends of a hollow spindle 16 by a weld 35. However, these members may be formed as an integral part of the spindle itself or they may be secured together by bolts or the like.

Each of the male elements 32 is provided with a central axially extending opening or cavity 38 having a reduced area at the lower end thereof. Within each cavity there is positioned a compression spring 39 which is confined between two end plates 41 and 42 secured together by a stud bolt 43 having a nut 43a at the free end which may be adjusted to limit the extent to which the spring may be expanded. At its outer surface, the plate 42 is provided with a spherical bearing surface 45.

Secured within a coupling sleeve 24 by means of a plurality of studs 46 there is a circular plate 47 having a central tapering recess 48 within which there is positioned a wear plate 49 which engages with the spherical bearing surface 45 at all times whether or not the coupling is connected to the neck of the roll. As shown in Figure 2, when the universal couplings are connected to the roll neck and the pinion stand drive shafts there is a slight clearance between the plates 47 and the roll neck and shaft ends.

To the end of each casing 24 an annular stop ring 51 is secured by studs 52, the ring having an inner axially extending projection 53 which extends toward the hub portion 33 of the male coupling elements 32 and is adapted to make contact with the hub when the coupling is disconnected from the roll neck. Between the rings 51 and the spindle there is positioned a suitable lubrication seal 54 which is secured to each of the rings 51 by means of a keeper plate 55 attached to the rings by studs 56 thus forming a lubricant closure for the coupling members at their points of engagement with one another.

The operation of the coupling herein disclosed may be briefly summarized as follows: When the spindles 16 are in their driving relationship as shown in Figure 2, the coupling members being engaged with the roll necks and with the pinion stand shafts, the helical springs are compressed so that the rings 51 and casings 24 connected thereto assume the positions as shown therein. As noted heretofore, should the casing 24 inadvertently strike the end of the roll neck on assembly of the coupling, any shock incident thereto will be absorbed by the spring. Further, when the roll neck shoulder strikes against the end of the casing when assembly is being completed the springs are compressed sufficiently to separate the projections 53 and the hub 33. However, when it is desirable to remove a roll from the mill either for replacement or for redressing, as the neck of the roll is withdrawn from its engaged position with the coupling casing 24, the expanding compression spring 39 pushes the plate 42 and casing 24 outward thereby to engage the projections 53 with the hub of the male member with sufficient force to firmly but yieldably maintain the casing 24 in its axially aligned relationship with respect to the spindle. Thus, when the roll is to be connected to the coupling, it is merely necessary to slide the roll forward and insert the neck thereof into the casing.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A coupling for joining together a pair of shafts in driving relationship comprising a first coupling member adapted to be operatively connected to one of said shafts, a second coupling member adapted to be connected to the other of said shafts and engaged in driving relationship with said first member, said members being movable in an axial direction relative to one another, yieldable pressure exerting means interposed between and normally biasing said members away from one another and an abutment on one of said members adapted to be engaged with the other of said members thereby to limit the relative movement between said members, said yieldable means adapted to exert a force of an order sufficient to maintain said members in an axially aligned relationship when said coupling is disconnected from one of said shafts.

2. A coupling for joining together a pair of shafts in driving relationship comprising a first coupling member adapted to be operatively connected to one of said shafts, a second coupling member adapted to be operatively connected to the other of said shafts and engaged in driving relationship with said first member, said members being movable in an axial direction relative to one another, stop means secured to one of said members and engageable with the other of said members thereby to determine the extent of the relative axial movement between said members, and yieldable pressure means between, in engagement with and normally biasing said members in a direction to engage said one member with said stop, said pressure means adapted to exert a force of an order sufficient to maintain said members in an axially aligned relationship when the coupling is disconnected from one of said shafts.

3. A coupling for joining together a pair of shafts in driving relationship comprising a first coupling member provided with a driving connection for engaging one of said shaft, a second coupling member adapted to be engaged with the other of said shafts, stop means secured to said first member, yieldable means interposed between said members for exerting a sufficient force between and on the disconnection of said coupling from one of said shafts for moving one of said members relative to the other thereby to engage said stop means with one of the faces of the other member and to maintain the members in axial alignment with respect to one another.

4. A coupling for joining together a pair of shafts in driving relationship comprising a coupling member including a casing provided at one end with a driving connection for engaging one of said shafts, a second coupling member adapted to be secured to the other of said shafts, stop means secured to said casing for preventing said coupling members from becoming disengaged, and yieldable means operably connected to said casing for urging said casing in an axial direction and with sufficient force on disconnection of said coupling from one of said shafts thereby to engage said stop means with one of the faces of the other member and to maintain the casing and said male member in axial alignment with respect to one another.

5. A coupling for joining together a pair of shafts in driving relationship comprising a female coupling member including a casing provided at one end with a driving connection for engaging one of said shafts, a male coupling member secured to the other shaft having a central axially extending cavity therein, stop means secured to said casing for preventing said coupling members from becoming disengaged, and yieldable means secured within said cavity and operably connected to said casing for urging said casing in an axial direction with sufficient force on disconnection of said coupling from one of said shafts thereby to engage said stop means with one of the faces of the male member and to maintain the casing and the male member in axial alignment with respect to one another.

6. A coupling for joining together a pair of shafts in driving relationship comprising a first coupling member including a casing having a series of teeth formed on the inner surface and at one end thereof and provided at the other end with a driving connection for engaging one of said shafts, a second coupling member secured to the other shaft provided with a series of teeth formed on the outer periphery thereof adapted to be engaged with the teeth of said other member, the teeth of said members being so arranged as to permit relative axial movement between said coupling members and yieldable means supported by one of said members and operably engageable with the other of said members whereby on disconnection of either of said couplings the members of the coupling so disconnected are moved in a limited axial direction relative to and into endwise engagement with one another to maintain said members in axial alignment with respect to one another.

7. A coupling according to claim 6 in which there is provided a lubricant sealing means between said members.

8. A coupling according to claim 6 including spherical bearing means interposed between said yieldable means and said casing.

9. A coupling according to claim 6 in which the yieldable means comprises a compression spring confined between said coupling members.

10. A coupling according to claim 6 in which a stop means is secured to said first member, and a bearing surface is provided upon said second member with which said stop means makes contact when the first coupling member is disengaged from the shaft thereby to maintain said coupling members in an axially aligned relationship.

11. An enclosed coupling for joining together a pair of shafts in driving relationship comprising a first coupling member adapted to be operatively connected to one of said shafts, a second coupling member adapted to be connected to the other of said shafts, sealing means interposed between said members thereby to form a lubricant closure for said members, and yieldable means operatively connected to and for moving said elements in a limited axial direction relative to each other thereby to engage portions of one of said elements with portions of the other thus to maintain said coupling members in axial alignment with respect to one another when said couplings are disconnected from said shafts.

12. A coupling for joining together a pair of shafts in driving relationship comprising a hollow casing into one end of which the end of a shaft is adapted to be inserted in driving relationsip, a plurality of gear teeth formed on the inner surface and adjacent to the other end of said member, a male coupling member, a head formed on said member, a plurality of gear teeth formed on the outer periphery of said head adapted to mesh with said teeth of said casing when said head is inserted in said casing in driving relationship, a stop ring secured to the end of and projecting inwardly of said casing whereby to form a closure within which said head of said male coupling member is confined, and a compression spring between, in engagement with and normally biasing said head toward said ring, said spring adapted to exert a force of an order sufficient to maintain said members in an axially aligned relationship when the coupling is disconnected from one of said shafts.

References Cited in the file of this patent

UNITED STATES PATENTS

| | | |
|---|---|---|
| 1,324,898 | Hopcraft | Dec. 16, 1919 |
| 1,835,506 | Linn | Dec. 8, 1931 |
| 1,860,762 | Wyrick | May 31, 1932 |
| 2,051,085 | Ilseman | Aug. 18, 1936 |
| 2,188,205 | Osborne | Jan. 23, 1940 |
| 2,304,766 | Pratt | Dec. 8, 1942 |
| 2,618,941 | Iversen | Nov. 25, 1952 |
| 2,769,323 | O'Malley | Nov. 6, 1956 |